United States Patent
Ronkainen

(10) Patent No.: US 8,654,076 B2
(45) Date of Patent: Feb. 18, 2014

(54) TOUCH SCREEN HOVER INPUT HANDLING

(75) Inventor: Sami Pekka Ronkainen, Tampere (FI)

(73) Assignee: Nokia Corporation, Espoo (FI)

( * ) Notice: Subject to any disclaimer, the term of this patent is extended or adjusted under 35 U.S.C. 154(b) by 146 days.

(21) Appl. No.: 13/421,488

(22) Filed: Mar. 15, 2012

(65) Prior Publication Data

US 2013/0241827 A1    Sep. 19, 2013

(51) Int. Cl.
  *G06F 3/033*    (2013.01)
(52) U.S. Cl.
  USPC ........................................... 345/157
(58) Field of Classification Search
  None
  See application file for complete search history.

(56) References Cited

U.S. PATENT DOCUMENTS

| | | |
|---|---|---|
| 7,760,187 B2 | 7/2010 | Kennedy |
| 2006/0161870 A1 | 7/2006 | Hotelling et al. |
| 2008/0165142 A1 | 7/2008 | Kocienda et al. |
| 2009/0207139 A1 | 8/2009 | Kraft |
| 2009/0237371 A1 | 9/2009 | Kim et al. |
| 2010/0207904 A1 | 8/2010 | Kolmykov-Zotov et al. |
| 2011/0164060 A1 | 7/2011 | Miyazawa et al. |
| 2012/0068948 A1* | 3/2012 | Tomoda ........................ 345/173 |
| 2012/0154331 A1* | 6/2012 | Hasui .......................... 345/174 |

FOREIGN PATENT DOCUMENTS

| | | |
|---|---|---|
| EP | 2 144 147 A2 | 1/2010 |
| WO | WO 2009/001179 A1 | 12/2008 |
| WO | WO 2009/104064 A1 | 8/2009 |

OTHER PUBLICATIONS

Davies, Chris; Cypress Add Finger-Hover Tracking to Touchscreens; Slashgear; Apr. 21, 2010; downloaded at http://www.slashgear.com/cypress-add-finger-hover-tracking-to-touchscreens-video-2182656/; pp. 1-11.
International Search Report and Written Opinion for Application No. PCT/FI2013/050289, dated Jun. 25, 2013.

* cited by examiner

*Primary Examiner* — Jason Olson
(74) *Attorney, Agent, or Firm* — Alston & Bird LLP

(57) ABSTRACT

Apparatus has at least one processor and memory having computer-readable when executed, in a normal mode, to cause display of plural discrete items on a touch screen, and in response to detecting a user's digit at a location hovering over but not touching the screen while plural discrete items are being displayed, to enter a zoom-pan mode and cause zooming of displayed plural discrete items and to respond to detection of movement of the user's digit to a different hover location over the screen by causing panning of plural discrete items displayed on the screen, and to respond to detection of a touch input by entering a pointing mode to prevent panning of the displayed plural discrete items with movement of location of the touch input within predefined criteria, and to cause movement of a cursor, pointer or marker as location of the touch input changes.

19 Claims, 16 Drawing Sheets

TOUCH SCREEN HOVER INPUT HANDLING

FIELD OF THE INVENTION

This invention relates to handling inputs on touch screens with hover detection.

BACKGROUND TO THE INVENTION

It is common for devices such as mobile telephones, smartphones and tablet computers to provide a touch-sensitive display, or touch screen, through which a user can interact with software executed on a processor of the device. Touch screens are increasingly commonly being applied to laptop and desktop computers.

A new generation of touch screens is able to detect hover inputs as well as touch inputs, and detect the location of the hover inputs in the plane of the touch screen (the x,y location). Hover inputs are inputs where a user's digit (typically a finger) is located near to the touch screen but is not touching the screen. These touch screens provide new opportunities for user interface design, better designs allowing users better to control their device to perform the actions and tasks that the user requires to be performed.

SUMMARY OF THE INVENTION

A first aspect of the invention provides a method comprising:
  in a normal mode, causing display of plural discrete items on a touch screen;
  in response to detecting when in the normal mode a user's digit at a location hovering over but not touching the touch screen while plural discrete items are being displayed in the normal mode, entering a zoom-pan mode;
  in response to entering the zoom-pan mode, causing zooming of the displayed plural discrete items;
  when in the zoom-pan mode, responding to detection of movement of the user's digit to a different hover location over the touch screen by causing panning of the plural discrete items displayed on the touch screen;
  when in the zoom-pan mode, responding to detection of a touch input by entering a pointing mode;
  when in the pointing mode, preventing panning of the displayed plural discrete items with movement of the location of the touch input within predefined criteria; and
  when in the pointing mode, causing movement of a cursor, pointer or marker as the location of the touch input changes.

The discrete items may be text characters. Here, the method may comprise depositing a cursor at the location of the touch input in response to detecting removal of the touch input when in the pointing mode.

The discrete items may be icons. Here, the method may comprise comprising selecting an icon at the location of the touch input in response to detecting removal of the touch input when in the pointing mode.

The method may comprise responding to detecting removal of the touch input when in the pointing mode by reverting to the normal mode and causing zooming out of the plural discrete items.

The method may comprise responding to detecting removal of the touch input when in the pointing mode by reverting to the normal mode and causing zooming out of the plural discrete items to a zoom level that existed at the time of entering the zoom-pan mode.

The method may comprise responding to detecting removal of the touch input when in the zoom-pan mode by reverting to the normal mode and causing zooming out of the plural discrete items.

The method may comprise responding to detecting removal of the touch input when in the zoom-pan mode by reverting to the normal mode and causing zooming out of the plural discrete items to a zoom level that existed at the time of entering the zoom-pan mode.

The invention also provides a computer program comprising instructions that when executed by a computer apparatus control it to perform the method above.

A second aspect of the invention provides apparatus comprising:
  means for, when the apparatus is in a normal mode, causing display of plural discrete items on a touch screen;
  means responsive when the apparatus is in a normal mode to detecting a user's digit at a location hovering over but not touching the touch screen while plural discrete items are being displayed in the normal mode to enter a zoom-pan mode;
  means responsive to entering the zoom-pan mode to cause zooming of the displayed plural discrete items;
  means for, when the apparatus is in the zoom-pan mode, responding to detection of movement of the user's digit to a different hover location over the touch screen by causing panning of the plural discrete items displayed on the touch screen;
  means for, when the apparatus is in the zoom-pan mode, responding to detection of a touch input by entering a pointing mode;
  means for, when the apparatus is in the pointing mode, preventing panning of the displayed plural discrete items with movement of the location of the touch input within predefined criteria; and
  means for, when the apparatus is in the pointing mode, causing movement of a cursor, pointer or marker as the location of the touch input changes.

The discrete items may be text characters. Here, the apparatus may comprise means for depositing a cursor at the location of the touch input in response to detecting removal of the touch input when in the pointing mode.

The discrete items may be icons. Here, the apparatus may comprise means for selecting an icon at the location of the touch input in response to detecting removal of the touch input when in the pointing mode.

The apparatus may comprise means for responding to detecting removal of the touch input when in the pointing mode by reverting to the normal mode and causing zooming out of the plural discrete items.

The apparatus may comprise means for responding to detecting removal of the touch input when in the pointing mode by reverting to the normal mode and causing zooming out of the plural discrete items to a zoom level that existed at the time of entering the zoom-pan mode.

The apparatus may comprise means for responding to detecting removal of the touch input when in the zoom-pan mode by reverting to the normal mode and causing zooming out of the plural discrete items.

The apparatus may comprise means for responding to detecting removal of the touch input when in the zoom-pan mode by reverting to the normal mode and causing zooming out of the plural discrete items to a zoom level that existed at the time of entering the zoom-pan mode.

The apparatus may be a computing device, for instance a mobile phone, portable computer or non-portable computer.

A third aspect of the invention provides apparatus, the apparatus having at least one processor and at least one memory having computer-readable code stored thereon which when executed controls the at least one processor:

in a normal mode, to cause display of plural discrete items on a touch screen;

in response to detecting when in the normal mode a user's digit at a location hovering over but not touching the touch screen while plural discrete items are being displayed in the normal mode, to enter a zoom-pan mode;

in response to entering the zoom-pan mode, to cause zooming of the displayed plural discrete items;

when in the zoom-pan mode, to respond to detection of movement of the user's digit to a different hover location over the touch screen by causing panning of the plural discrete items displayed on the touch screen;

when in the zoom-pan mode, to respond to detection of a touch input by entering a pointing mode;

when in the pointing mode, to prevent panning of the displayed plural discrete items with movement of the location of the touch input within predefined criteria; and when in the pointing mode, to cause movement of a cursor, pointer or marker as the location of the touch input changes.

The discrete items may be text characters. Here, the computer-readable code when executed may control the at least one processor to deposit a cursor at the location of the touch input in response to detecting removal of the touch input when in the pointing mode.

The discrete items may be icons. Here, the computer-readable code when executed may control the at least one processor to select an icon at the location of the touch input in response to detecting removal of the touch input when in the pointing mode.

The computer-readable code when executed may control the at least one processor to detect removal of the touch input when in the pointing mode by reverting to the normal mode and causing zooming out of the plural discrete items.

The computer-readable code when executed may control the at least one processor to respond to detecting removal of the touch input when in the pointing mode by reverting to the normal mode and causing zooming out of the plural discrete items to a zoom level that existed at the time of entering the zoom-pan mode.

The computer-readable code when executed may control the at least one processor to respond to detecting removal of the touch input when in the zoom-pan mode by reverting to the normal mode and causing zooming out of the plural discrete items.

The computer-readable code when executed may control the at least one processor to respond to detecting removal of the touch input when in the zoom-pan mode by reverting to the normal mode and causing zooming out of the plural discrete items to a zoom level that existed at the time of entering the zoom-pan mode.

A fourth aspect of the invention provides a non-transitory computer-readable storage medium having stored thereon computer-readable code, which, when executed by computing apparatus, causes the computing apparatus to perform a method comprising:

in a normal mode, causing display of plural discrete items on a touch screen;

in response to detecting when in the normal mode a user's digit at a location hovering over but not touching the touch screen while plural discrete items are being displayed in the normal mode, entering a zoom-pan mode;

in response to entering the zoom-pan mode, causing zooming of the displayed plural discrete items;

when in the zoom-pan mode, responding to detection of movement of the user's digit to a different hover location over the touch screen by causing panning of the plural discrete items displayed on the touch screen;

when in the zoom-pan mode, responding to detection of a touch input by entering a pointing mode;

when in the pointing mode, preventing panning of the displayed plural discrete items with movement of the location of the touch input within predefined criteria; and when in the pointing mode, causing movement of a cursor, pointer or marker as the location of the touch input changes.

A fifth aspect of the invention provides a computer-implemented method comprising:

in a normal mode, causing display of plural discrete items on a touch screen;

in response to detecting when in the normal mode a user's digit at a location hovering over but not touching the touch screen while plural discrete items are being displayed in the normal mode, entering a zoom-pan mode;

in response to entering the zoom-pan mode, causing zooming of the displayed plural discrete items;

when in the zoom-pan mode, responding to detection of movement of the user's digit to a different hover location over the touch screen by causing panning of the plural discrete items displayed on the touch screen;

when in the zoom-pan mode, responding to detection of a touch input by entering a pointing mode;

when in the pointing mode, preventing panning of the displayed plural discrete items with movement of the location of the touch input within predefined criteria; and when in the pointing mode, causing movement of a cursor, pointer or marker as the location of the touch input changes.

BRIEF DESCRIPTION OF THE DRAWINGS

Embodiments of the invention will now be described, by way of example only, with reference to the accompanying drawings, in which.

DESCRIPTION OF EMBODIMENTS OF THE INVENTION

Embodiments described herein relate to an apparatus configured to provide a two-step cursor placement or selection, the first step providing zooming with pan ability in response to a hover input and the second step providing fine cursor placement or selection whilst a zoomed display is locked.

Figure 1:
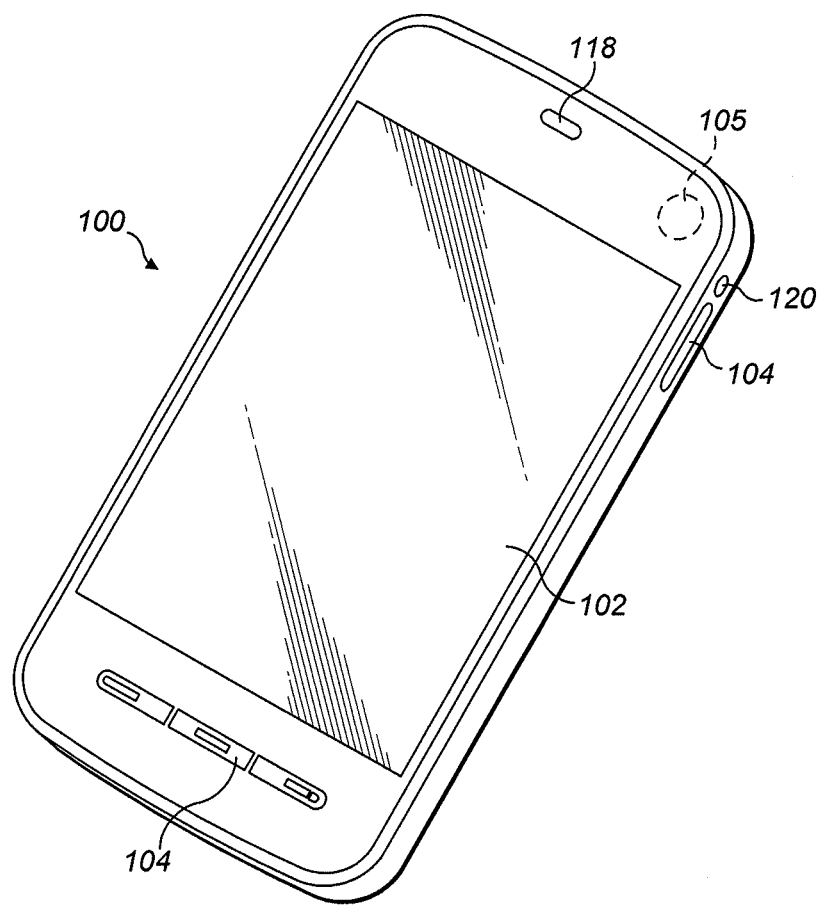
FIG. 1 is a perspective view of a mobile terminal embodying aspects of the invention.

Referring firstly to FIG. 1, a terminal 100 is shown. The exterior of the terminal 100 has a touch sensitive display or touch screen 102 with hover detection. The terminal 100 also has hardware keys 104. The terminal also has a speaker 118. The terminal 100 includes a headphone port 120. Other features are present but are omitted from this description for clarity and conciseness.

Figure 2:
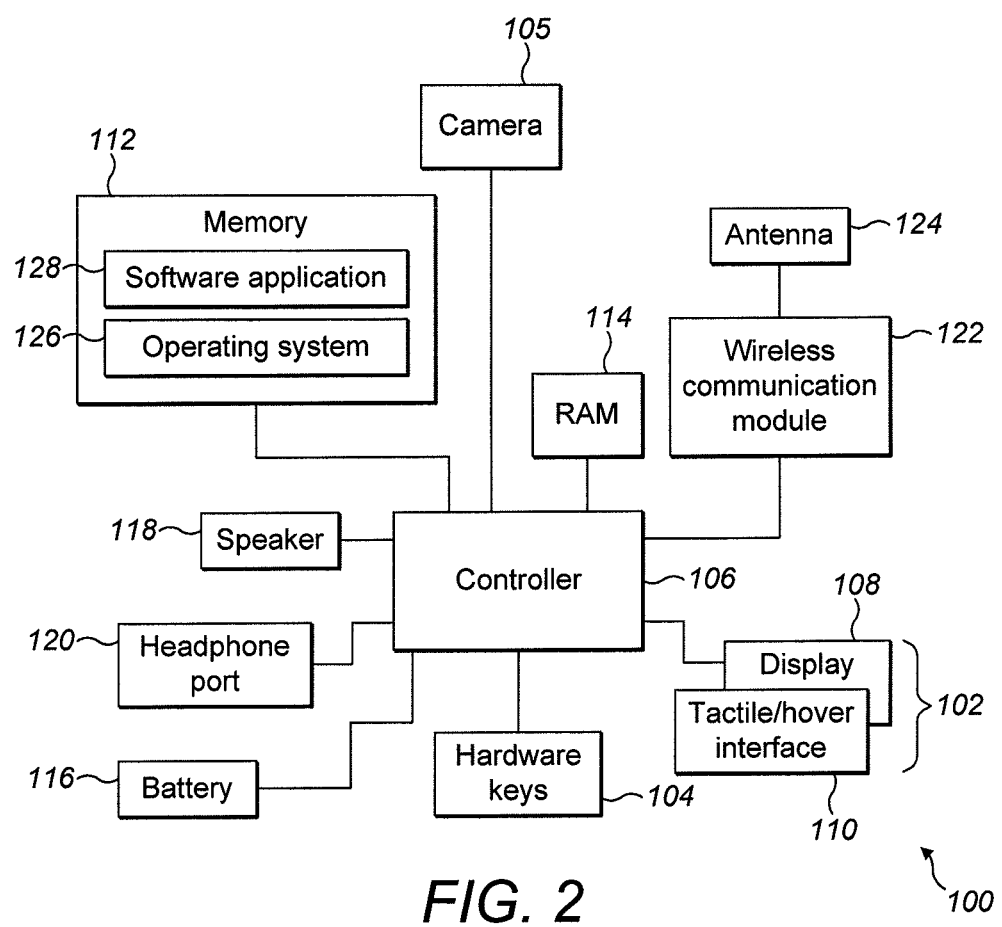
FIG. 2 is a schematic diagram illustrating components of the FIG. 1 mobile terminal and their interconnection.

FIG. 2 shows a schematic diagram of the components of terminal 100. The terminal 100 has a controller 106, a touch sensitive display 102 comprised of a display part 108 and a tactile/hover interface part 110, the hardware keys 104, a memory 112, RAM 114, a speaker 118, the headphone port 120, a wireless communication module 122, an antenna 124 and a battery 116. The controller 106 is connected to each of the other components (except the battery 116) in order to control operation thereof.

The memory 112 may be a non-volatile memory such as read only memory (ROM) a hard disk drive (HDD) or a solid state drive (SSD). The memory 112 stores, amongst other things, an operating system 126 and may store software applications 128. The RAM 114 is used by the controller 106 for the temporary storage of data. The operating system 126 may contain code which, when executed by the controller 106 in conjunction with RAM 114, controls operation of each of the hardware components of the terminal.

The controller 106 may take any suitable form. For instance, it may be a microcontroller, plural microcontrollers, a processor, or plural processors.

The terminal 100 may be a mobile telephone or smartphone, a personal digital assistant (PDA), a portable media player (PMP), a portable computer or any other device capable of running software applications. In some embodiments, the terminal 100 may engage in cellular communications using the wireless communications module 122 and the antenna 124. The wireless communications module 122 may be configured to communicate via several protocols such as GSM, CDMA, UMTS, Bluetooth and IEEE 802.11 (Wi-Fi).

The display part 108 of the touch sensitive display 102 is for displaying images and text to users of the terminal. The tactile/hover interface part 110 is for receiving touch and hover inputs from users.

The touch screen with hover detection 102 may take any suitable form. The tactile and hover detection aspects of the tactile/hover interface 110 in most instances utilise the same components, although they may alternatively be separate aspects using none or only some shared components. The outputs of the tactile/hover interface 110 may take any suitable form. They may take the form or x,y and z coordinates, where x and y are directions in the plane of the touch screen 102 and z is a direction perpendicular to the touch screen 102, so denoting hover distance. The z direction output of the tactile/hover interface 110 may alternatively denote a strength or size or other scalar parameter of an input. The outputs may also include a size or strength parameter relating to an x,y touch input. The tactile/hover interface 110 preferably is a multi-touch device, with the capability to provide x,y outputs for each of plural touch inputs.

As well as storing the operating system 126 and software applications 128, the memory 112 may also store multimedia files such as music and video files. A wide variety of software applications 128 may be installed on the terminal including web browsers, email applications, other messaging applications such as SMS, IM and MMS applications, social networking applications, radio and music players, games and utility applications. Some or all of the software applications stored on the terminal may provide audio outputs. The audio provided by the applications may be converted into sound by the speaker(s) 118 of the terminal or, if headphones or speakers have been connected to the headphone port 120, by the headphones or speakers connected to the headphone port 120.

In some embodiments the terminal 100 may also be associated with external software applications not stored on the terminal. These may be applications stored on a remote server device and may run partly or exclusively on the remote server device. These applications can be termed cloud-hosted applications. The terminal 100 may be in communication with the remote server device in order to utilise the software application stored there. This may include receiving audio outputs provided by the external software application.

In some embodiments, the hardware keys 104 are dedicated volume control keys or switches. The hardware keys may for example comprise two adjacent keys, a single rocker switch or a rotary dial. In some embodiments, the hardware keys 104 are located on the side of the terminal 100.

In the following, actions taken will be understood to be provided under control of or by the controller 106 on the basis of instructions included in software comprising one of the software applications 128 or the operating system 126, or a combination of the operating system 126 and one or more software applications 128.

Operation of the terminal 100 in a first group of embodiments will now be described with reference to the flow chart of FIG. 3.

Figure 5:
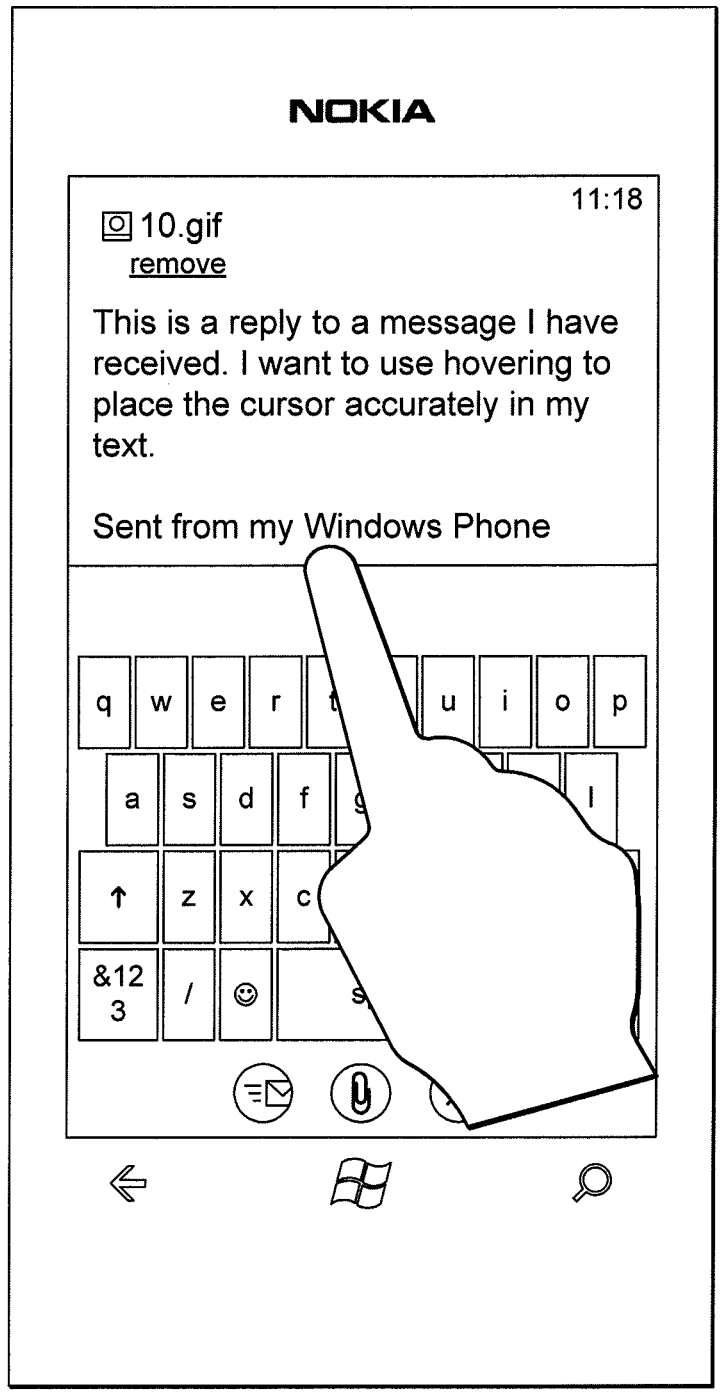
FIGS. 5 to 9 are screen shots illustrating displays of the FIG. 1 mobile device at different stages of operation in the first group of embodiments.

The operation starts at step S1, with the terminal 100 in normal mode. At step S2, text is displayed at a default zoom level. This is shown in FIG. 5.

At step S3, it is determined whether the zoom level has changed. The zoom level may change because of an input by a user, for instance using a pinch gesture, using a hardware key, or in some other way. If it is determined at step S3 that the zoom level has changed, at step S4 the zoom level is changed. If it is determined at step S3 that the zoom level has not changed or following step S4, at step S5 the text is displayed at the set zoom level. If the zoom level has not changed, then the set zoom level is the default zoom level. As such, FIG. 5 again represents the display resulting after step S5 when there has been no change in zoom level. FIG. 5 shows a text window being displayed by the terminal 100. The text window includes text wraparound such that text on one line is a continuation of the text on the line immediately above it. In the text window shown in FIG. 5, all of the width of the text window is displayed.

At step S6, it is determined whether a hover input is detected. A hover input, or just hover, may be detected in any suitable way. A hover may be detected in response to determining that a user's digit (typically a finger) is within the sensitivity range of the tactile/hover interface no. Alternatively, a hover may be detected in response to determining that a user's digit has been at a certain location within the zone of sensitivity of the tactile/hover interface no for greater than a predetermined period of time, which may be of the order of a few hundreds of milliseconds. Alternatively, a hover may be detected in response to determining that a user's digit is within a certain range, for instance 30 mm, of the touch screen 102.

If a hover input is not detected, the operation proceeds again to step S3. If it is determined that a hover input is detected, at step S7 the terminal 100 exits the normal mode and enters the zoom-pan mode. The transition from step S6 to step S7 is indicated by a transition T1 in FIG. 4.

Figure 4:
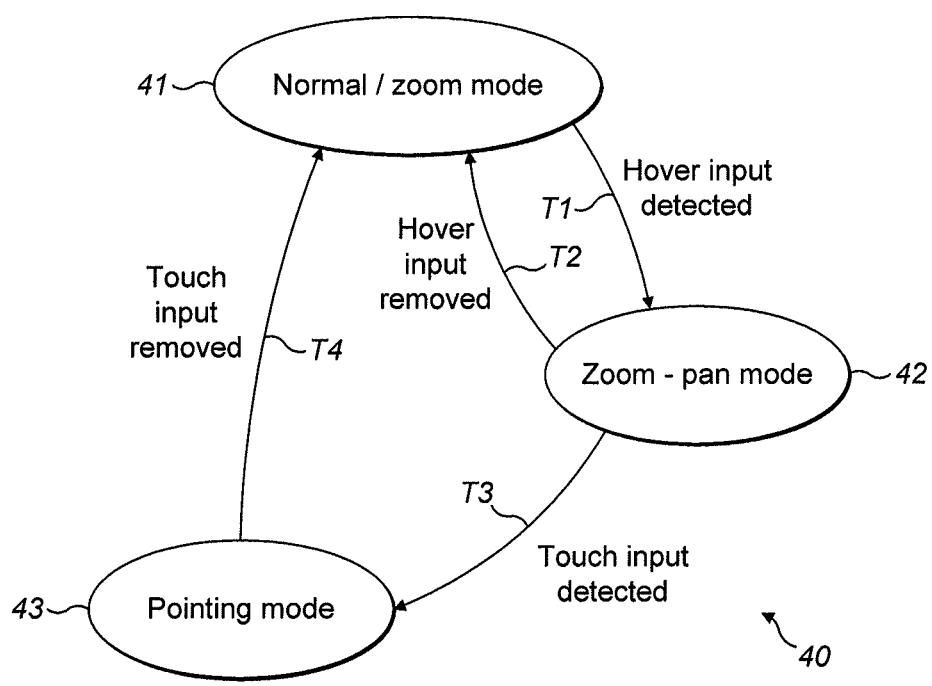
FIG. 4 is a state diagram illustrating states in which the FIGS. 1 and 2 mobile device may reside and possible transitions between those states.

In FIG. 4, the three states or modes of the terminal 100 are shown.

A first mode 41 is the normal/zoom mode. This is termed the normal mode above but if the zoom level is changed at step S4 then the mode can be termed the zoom mode. The term normal/zoom mode indicates the mode in which text is displayed at the set zoom level at step S5, which may be the default zoom level. In the normal/zoom mode, hover inputs and touch inputs provide responses that are outside the scope of this specification.

A second mode 42 is the zoom-pan mode. In the pan-zoom mode, a display is zoomed and panning can be achieved by moving a hover input.

A third mode 43 is a pointing mode. In the pointing mode, zooming is maintained and movement of a touch input causes movement of a cursor, pointer or marker without panning, except in certain circumstances.

As can be seen, the terminal 100 may transition between the normal/zoom mode and the zoom-pan mode 42 in a transition T1. The terminal 100 may transition between these two modes in the opposite direction on a transition T2. The terminal 100 may transition from the zoom-pan mode 42 to the pointing mode 43 on a transition T3. Finally, the terminal 100 may transition from the pointing mode 43 to the normal/zoom mode 41 with a transition T4.

Figure 6:
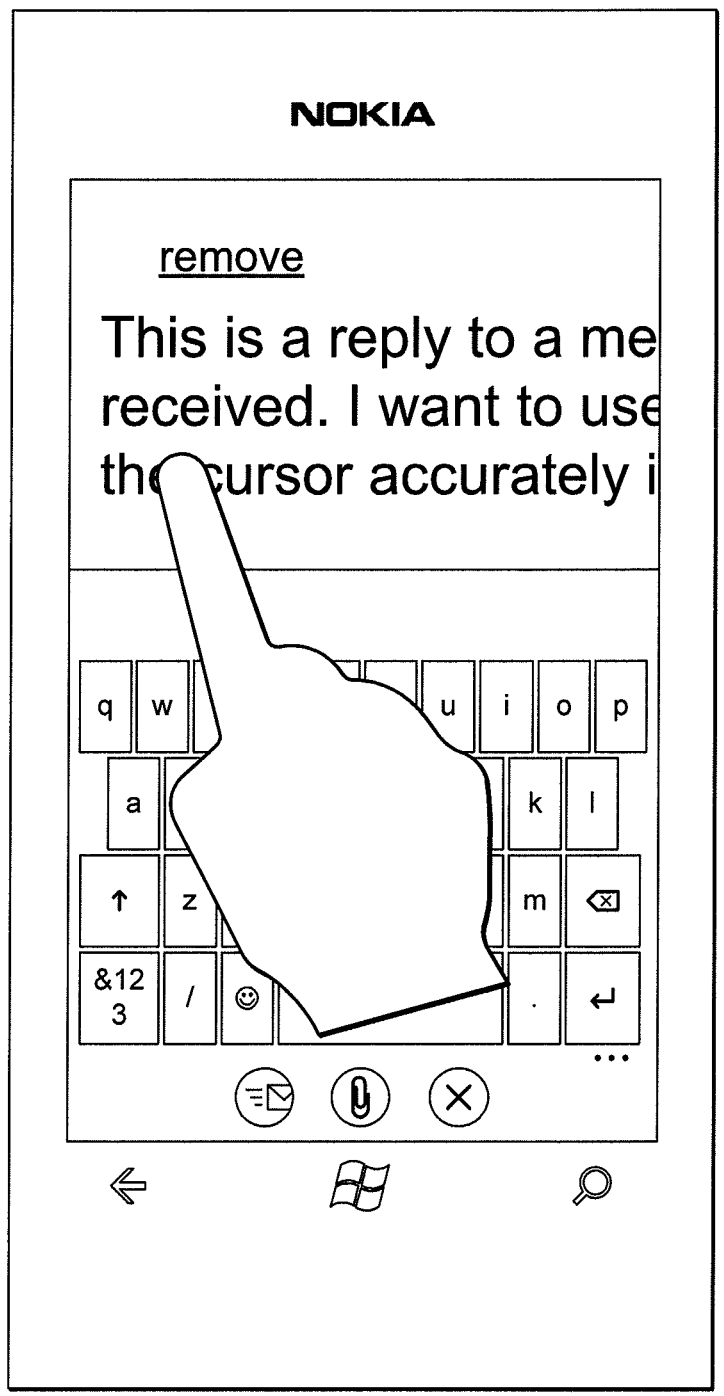

After this, at step S8 the zoom level is increased. Here, the zoom is centred around the location of the hover input. As such, it is the area of the display that was displayed at step S5 that is around the location of the hover input that is caused to be magnified. This is illustrated in FIG. 6. Here, the text at the left side of the display of FIG. 5 is shown as being magnified in FIG. 6. Parts of the display that are not near the location of the hover input are no longer displayed. This includes the right side of the display of FIG. 5.

Figure 7:
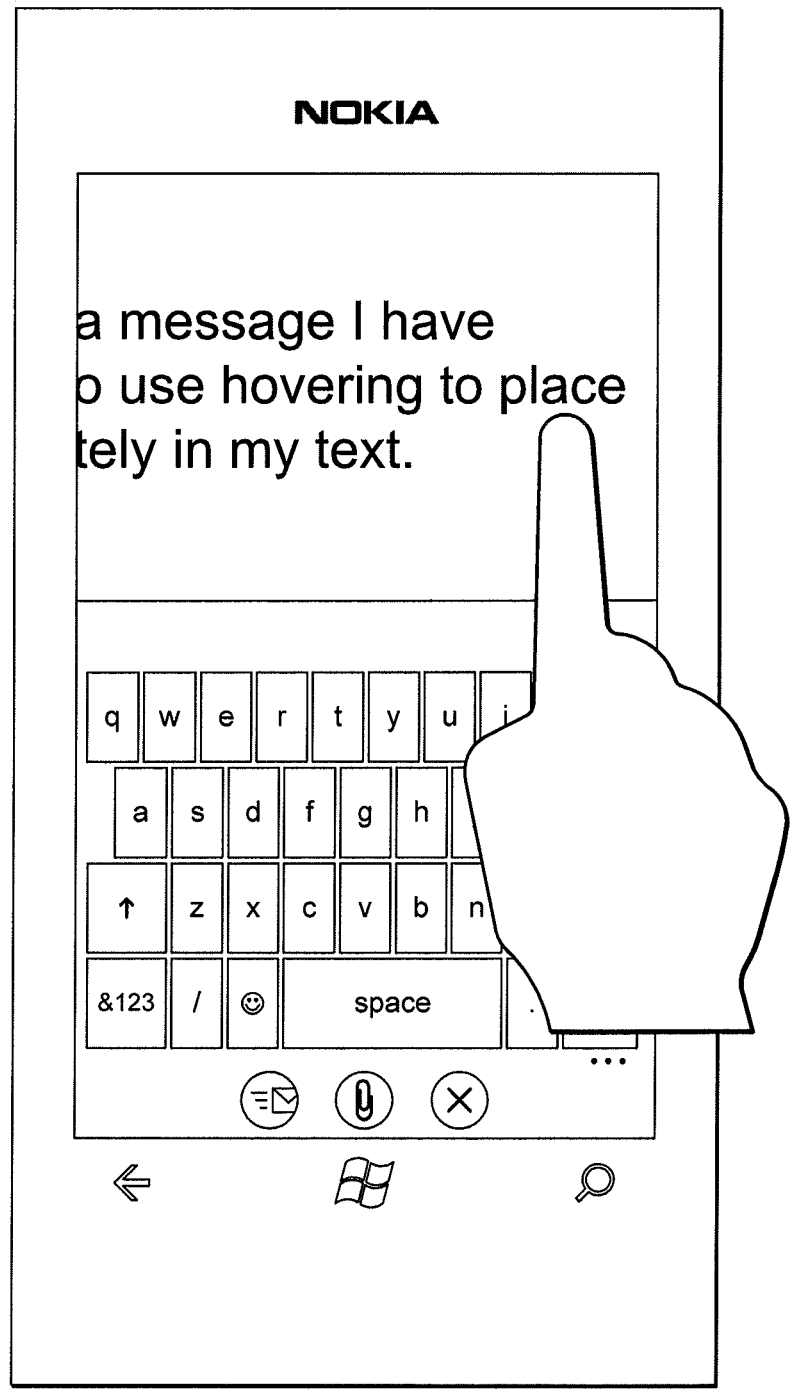

At step S9, it is determined whether the location of the hover input has changed. If the hover input location is determined to have changed at step S9, at step S10 the display is panned with movement of the hover input location. Here, the display is panned such that the text that is shown magnified follows the location of the hover input. Starting with the left side of the text being magnified, as shown in FIG. 6, movement of the hover input to the right results in the text displayed on the display scrolling to the left so that the text on the right side of the display of FIG. 5 is displayed. This is shown in FIG. 7.

Similarly, if the location of the hover input moves up, the displayed text is scrolled down so that the text at the top of the display shown in FIG. 5 as displayed at step S5 is then revealed and displayed. Panning with movement of the hover input at step S10 has regard to the edges of the text window. Panning is limited such that the display text does not move beyond the boundaries of the text window. This applies in both horizontal directions (left and right) and in both vertical directions (up and down).

Following step S10, the operation returns again to step S9, where it is determined whether the hover input location has changed.

When step S9 shows that no change in hover input location is detected, at step S11 it is determined whether the hover input has been removed. If step S11 determines that the hover input has been removed whilst the terminal 100 is in the zoom-pan mode, the zoom-pan mode is exited and the terminal 100 returns to the normal/zoom mode. In particular, the operation proceeds again to step S5. This is indicated by the transition T2 in FIG. 4.

If it is determined at step S11 that the hover input has not been removed, the terminal 100 remains in the zoom-pan mode and progresses to step S12. Here, it is determined whether a touch input has been detected. If a touch input has not been detected at step S12, the operation returns to step S9. If it is determined at step S12 that a touch input has been detected, the operation proceeds to step S13.

The effect of steps S9, S11 and S12 is such that the terminal 100 remains in the zoom-pan mode with the display being panned as the location of the hover input moves until either the hover input is removed or a touch input is detected. If the hover input is removed, the terminal 100 transitions T2 from the zoom-pan mode 42 to the normal/zoom mode 41. If a touch input is detected, the terminal 100 transitions T3 from the zoom-pan mode 42 to the pointing mode 43. The pointing mode is entered at step S13.

At step S14, the display is locked. This step prevents further panning of the display except in certain circumstances, that are explained below.

Figure 8:
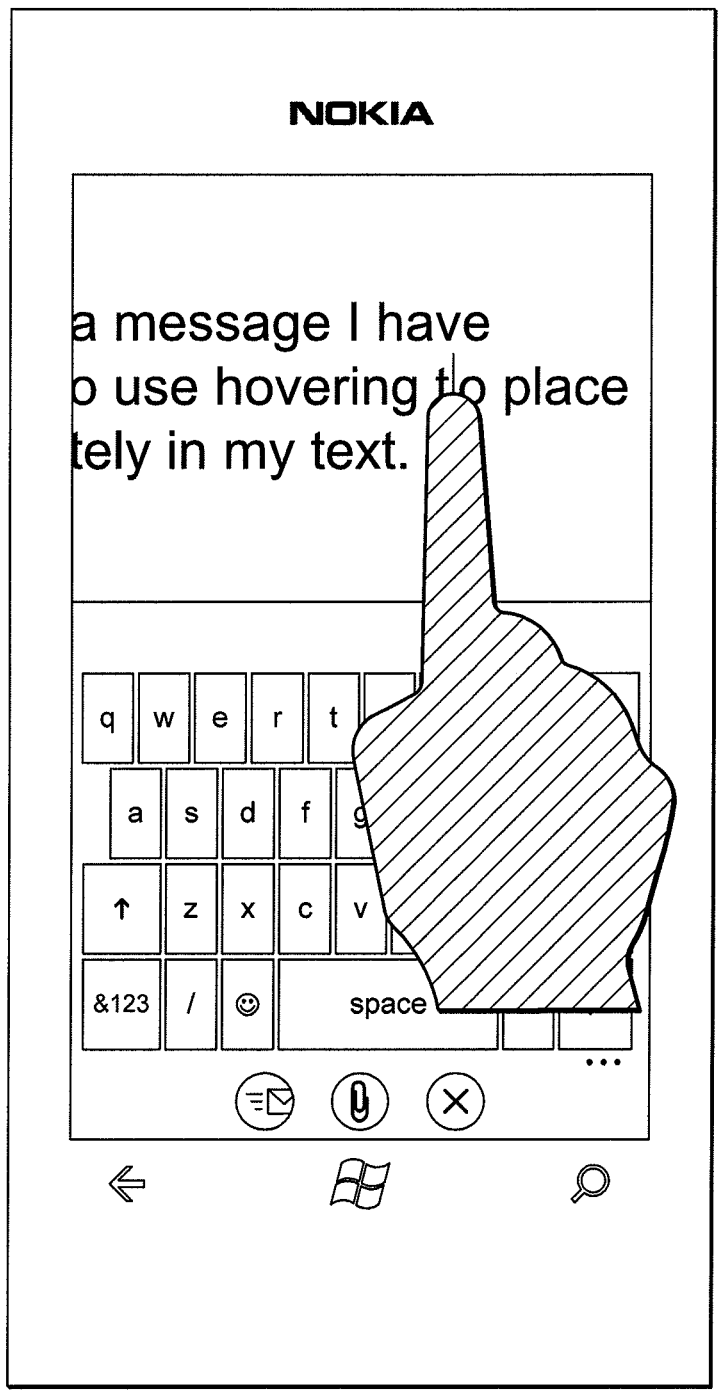

After the display is locked at step S14, a timer is reset and started at step S15. Then, at step S16 a cursor is inserted at the location of the touch input. This provides the display shown in FIG. 8.

At step S17 it is determined whether the touch input has been removed. If it is determined that the touch input has been removed at step S17, the cursor is left at the location of the touch input at step S18. After step S18, the operation returns to step S5. This constitutes the transition T4 from the pointing mode 43 to the normal/zoom mode 41. Following step S18, the text window is displayed at the zoom level in which it is last displayed at step S5. However, there is a difference in that the cursor is included in the text at the location of the touch input that was detected at step S12 and resulted in the insertion of a cursor at step S16.

If it is not determined at step S17 that the touch input has been removed, it is determined at step S19 whether the touch input location has moved. If the location is determined not to have moved, at step S20 it is determined whether the timer that was started at step S15 has expired. If the timer has not expired, the operation returns to step S17. As such, the operation repeats steps S17, S19 and S20 until it is determined that the touch input has been removed, in which case the terminal transitions T4 to the normal/zoom mode 41, or that the location of the touch input has moved, or that the timer has expired.

If at step S19 it is determined that the location of the touch input has moved, the operation proceeds to step S21. Here it is determined whether the new location of the touch input is at or near an edge of the display. The display here is the locked display from step S14, and so relates to the zoomed or magnified view. If it is determined at step S21 that the touch input is at the edge of the display, at step S22 the display is panned. Here, panning the display involves scrolling the magnified text in the opposite direction to the edge of the display at which the touch input is located. For instance, if the touch input is at or near the right edge of the magnified display, the text is scrolled to the left. Scrolling continues until the edge of the text window is located at the edge of the zoomed display. The speed of scrolling may be fixed, in the sense that the speed of scrolling is the same throughout the panning operation. Alternatively, the speed of scrolling may be dependent on the elapsed time since the start of the panning operation. For instance, the speed of scrolling may increase as the time elapsed since the start of the panning operation increases. Alternatively or additionally, the speed of scrolling in the panning operation may be dependent on the location of the touch input. For instance, a touch input at the very edge of the display may result in faster panning than a touch input that is near the edge of the display but further from the actual edge.

Panning in the left horizontal direction is similar. Panning in the up and down vertical directions also is similar.

Figure 3:
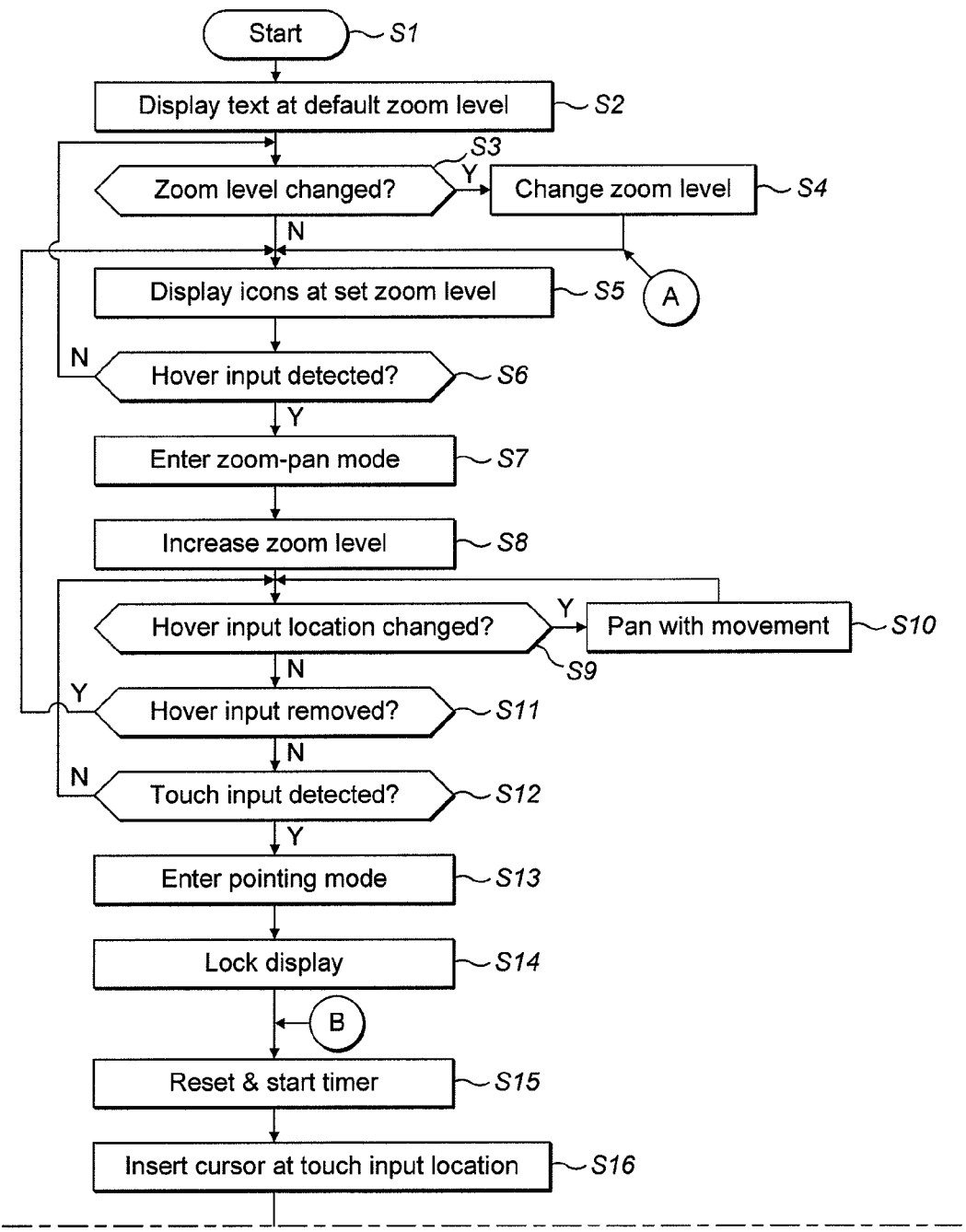
FIG. 3 is a flow chart illustrating operation of the FIGS. 1 and 2 mobile device in a first group of embodiments of the invention.
Figure 3:
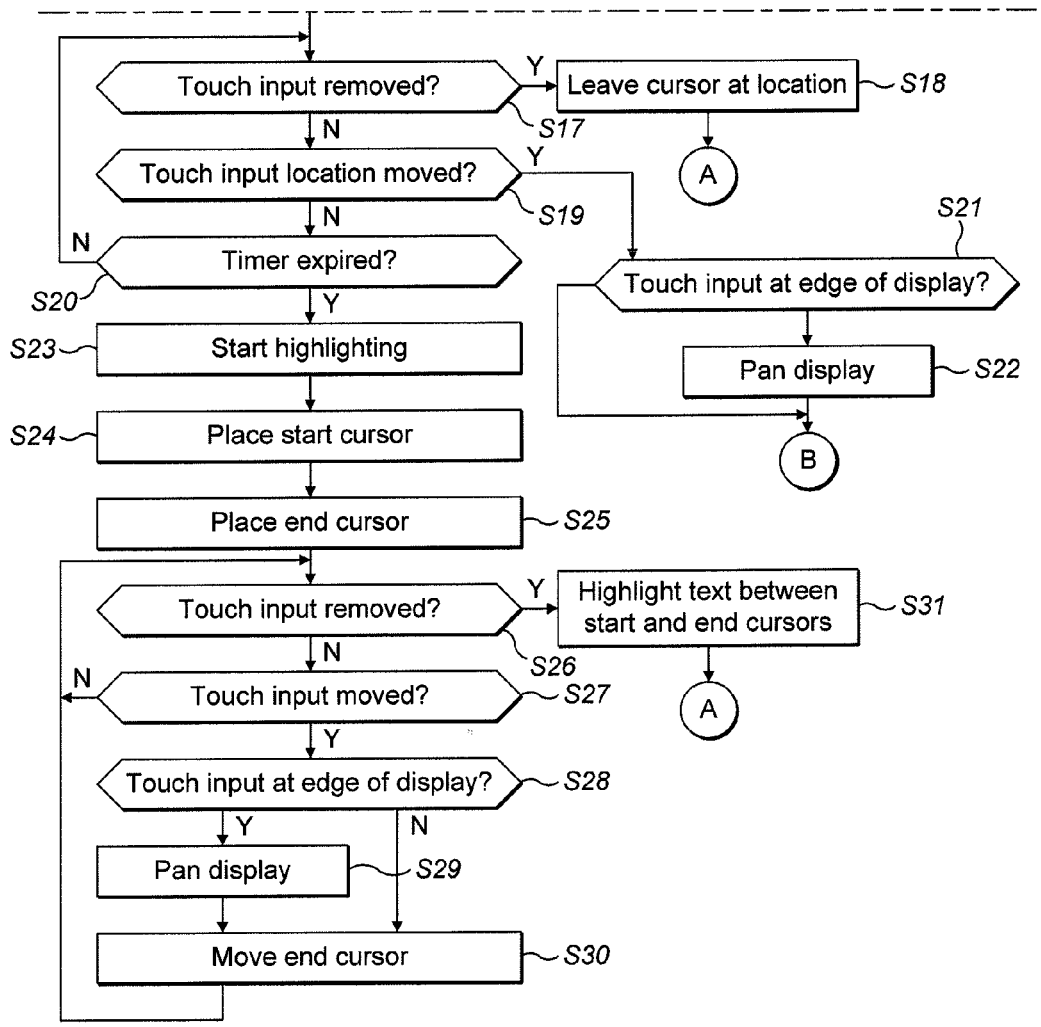

It will be appreciated that the operation of FIG. 3 results in panning of the display whilst the touch input is at or near the edge of the display, and that panning of the display is stopped in one of two situations. The first is when the display is panned such that the edge of the displayed text in the panning direction is the edge of the text window. The second is that the location of the touch input moves away from the edge of the display to a central region of the display. Upon movement of the user's digit from the edge of the display to a more central position, panning of the display is stopped and the location of the cursor continues to track the location of the touch input.

Figure 9:
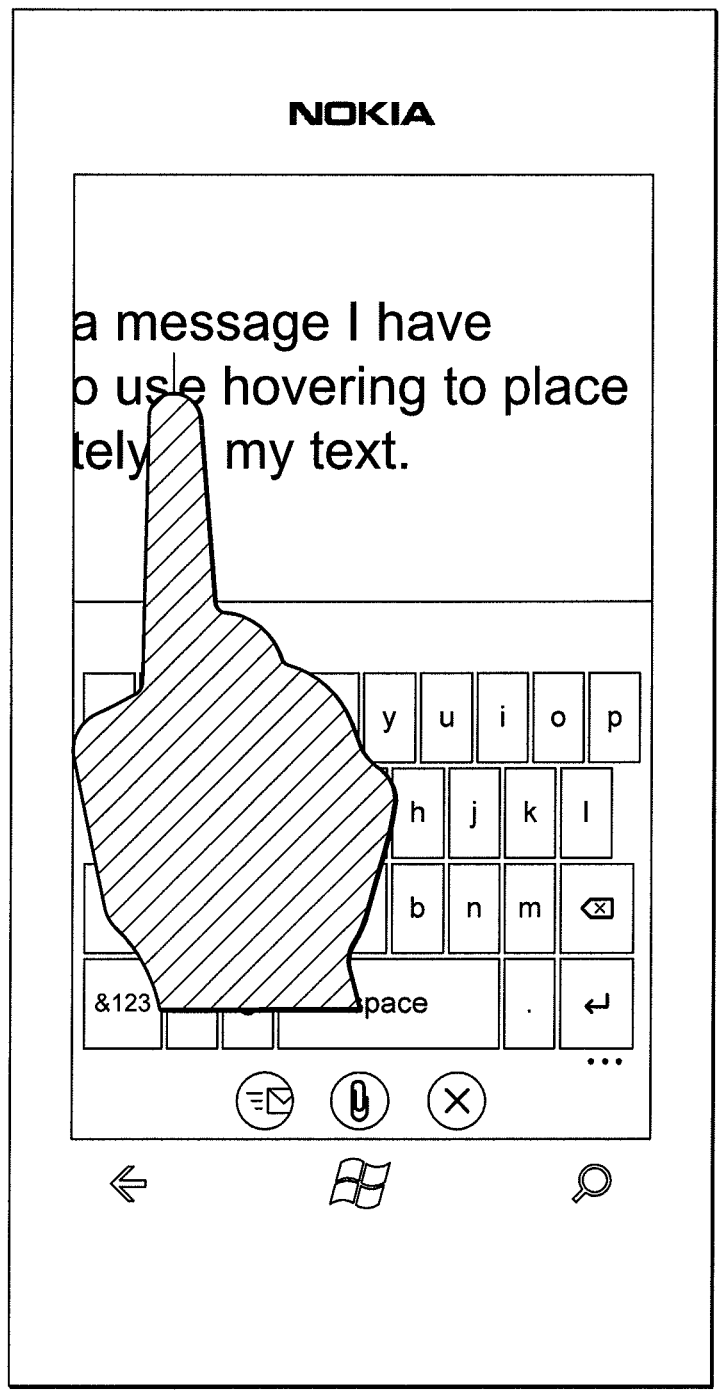

Following the panning of the display at step S22 or following a determination that the touch input is not at the edge of the display at step S21, the operation returns to step S15. Here, the timer is reset and the cursor is inserted at the location of the touch input. The resulting display is shown in FIG. 9.

The resetting and restarting of the timer at step S15 following movement of the location of the touch input allows the timer to be used to detect touch inputs without any change in location and having a duration longer than the period of the timer. In other words, the use of the timer allows the terminal 100 to detect when a static touch input of certain duration is received.

Instead of resetting the timer at step S15 if any movement of the touch input is detected at step S21, the timer may be reset only if more than a threshold amount of movement is determined to have occurred since the timer was reset and started. This amount of movement may be calculated in the x,y plane, or in the x or y direction. The x,y or x or y threshold may take any suitable value. For instance, the value may correspond to 2 mm or a few mm. This allows the user's touch input to move slightly, as can occur unintentionally, without the timer being reset.

If it is determined at step S20 that the timer has expired, at step S23 highlighting is started. Following step S23, a start cursor is placed at step S24. The start cursor is placed at the location of the touch input, which is the last location of the touch input if it has moved between the touch input being started and the timer expiring. The start cursor marks the beginning of a section of text that is selected by a text selection operation.

After the start cursor has been placed, the end cursor is placed at step S25. The end cursor marks the end of a section of text that is selected by the text selection operation.

The end cursor is placed at the location of the touch input, which is initially the same location as the start cursor. At step S26, it is determined whether the touch input has been removed. In response to determining that the touch input has not been removed, at step S27 it is determined whether the touch input has moved. If the touch input is determined not to have moved, the operation returns to step S26. The operation remains at steps S26 and S27 until either the location of the touch input is moved or the touch input is removed.

If step S27 determines that the touch input has moved, at step S28 it is determined whether the touch input is at the edge of the display. In the event of a positive determination, the display is panned at step S29. This is the same as the panning of the display at step S22, described above. However, in step S29 the start cursor remains at the location in which it was placed at step S24.

Following panning of the display at step S29, or following a determination that the touch input is not at the edge of the display at step S28, the end cursor is moved at step S30. The start cursor is not moved; it is only the end cursor that is moved as the touch input moves.

It will be appreciated that panning of the display at step S29 resulting from the touch input being at or near the edge of the display, as determined at step S28, causes movement of the end cursor as the text is scrolled on the zoomed display whilst the touch input remains substantially at the same location.

Following step S30, the operation returns to step S26. As such, once it has been determined at step S27 that the touch input has moved, the operation remains between steps S26 and S30 until it is determined at step S26 that the touch input has been removed.

Once it is determined that the touch input has been removed at step S26, at step S31 the text between the start and end cursors is highlighted. Visually, the text may be highlighted (or painted) as the end cursor is moved at step S30. However, it is only at step S31 that both the start and end cursors are fixed.

After step S31, the operation returns to step S5. Here, the terminal 100 transitions T4 from the pointing mode 43 to the normal/zoom mode 41. However, here, there is text highlighted between start and end cursors, unless there was no movement of the touch input between placing the start cursor at step S24 and determining that the touch input at step S26. If there was no movement of the end cursor, following step S31 the terminal 100 resides in the normal/zoom mode with a cursor at the location of the start cursor, which is the same location as the end cursor would be if it were present.

Features described above implement a two-stage cursor placement process. In the first stage, a hover input results in a zooming in of the displayed text window. At this first stage, the user can pan around the text window without placing a cursor. At the second stage, a touch input prevents further panning around the zoomed text window, and results in movement of the cursor. Because in the second stage the text window is zoomed or magnified, placement of the cursor at a location at which the user desires it to be placed is easier that it would have been prior to zooming.

Moreover, the cursor placement in the second stage can be achieved as a part of the same movement that resulted in the zooming. This contrasts with prior art schemes in which zooming can be provided only by a pinching movement or by operation of a separate zoom control. The two stage process of using a hover input first for zooming then a touch input for precise cursor placement can be said to provide a result that is greater than the sum of the constituent parts, since the two stages may be effected as part of the same movement of the user's digit.

It is worth noting that, when in the pointing mode, finger movement no longer affects the (zoomed or magnified) contents of the display. The contents of the display remain the same as prior to when the touch input was detected. Put another way, the user's digit no longer causes emulation of a magnifying glass centred at the digit location; instead the magnified view is locked. The magnified view is partially unlocked if the user's digit is moved to the edge of the touch screen or near to the edge, but only to the extent that the touch input remains at or near the edge of the display and the displayed text does not reach the edge of the text window in the relevant direction.

Additionally, the operation described above with reference to FIG. 3 allows the selection of a range of text. Additionally, the highlighting of this text is achieved whilst allowing placement of start and end cursors while in the zoomed or magnified state. Furthermore, allowing panning of the display after the start cursor has been placed and before placement of the end cursor allows text to be highlighted even if the start and end locations are not able to be viewed within the same display at the enlarged or zoomed size. In the operation described above with reference to FIG. 3, this is achieved by the user merely maintaining the touch input and moving their finger to the edge of the display in the direction in which the pan is required. This can be in a vertical or horizontal direction, or can be in both horizontal and vertical directions. The bounded text is selected upon the touch input ending.

What use is made of selected or highlighted text is outside the scope of this specification. However, it is envisaged that a user may select the text for performing a further action by executing a long press on the text, or perhaps on any part of the display, or by pressing a hardware 'options' key.

Similarly, the use that is made after a cursor has been placed in the text is outside the scope of this specification. However, it is envisaged that a user may insert text at the cursor location using a keyboard, for instance a virtual keyboard, or may delete text from the cursor location using a backspace key, for instance forming part of a virtual keyboard.

Placement of the cursor with respect to the location of the touch input may take any suitable form. For instance, the cursor may be placed directly at the location of the touch input, i.e. beneath the user's digit. Alternatively, the cursor may be placed slightly above the location of the touch input, i.e. above the location of the user's digit on the touch screen 102. The latter alternative may be preferred since it allows the user more easily to see the displayed cursor and its position in the text.

Although in the above explanation of FIG. 3 it is described that the cursor is not inserted into the text until the pointing mode 43 is entered by the terminal 100, in alternative embodiments within the first group of embodiments a cursor may already be present within the text. In some such embodiments, the cursor may remain in its original location whilst the terminal 100 is in the zoom-pen mode 42. Alternatively, the cursor may be caused not to be displayed whilst the terminal is in the zoom-pan mode. In either case, once the terminal 100 enters the pointing mode 43, the cursor is inserted at the location of the touch input that triggered the transition from the zoom-pan mode to the pointing mode 43. In other such embodiments, a section of text that is already highlighted by start and end cursors when in the normal/zoom mode may be changed in the pointing mode. For instance, the terminal 100 may be responsive to entering the pointing mode from the zoom-pan mode with a touch input located near to the location of a start or end cursor by causing that cursor to become attached to the touch input. Here, a user may reposition the cursor by moving the touch input in the pointing mode, with fine cursor placement being possible because of the zoom provided in the pointing mode. The other of the start and end cursors may be repositioned by the user by making a similar action although this time landing the touch input close to the location of the other cursor. In these other such embodiments, the locations of the cursors may have been placed by the user when the terminal was in a pointing mode or may have been placed in some other manner, for instance by placing a touch input on a word of text when the terminal 100 is in the normal/zoom mode.

It is envisaged that the user typically will know where they wish a cursor to be located in advance of making the user input. Upon making a hover input, the terminal 100 then enters the zoom-pan mode 42 and magnifies the position where the hover input was received. Upon making a touch input, the user may fine-tune their placement of the cursor by making adjustments in horizontal and/or vertical directions until the cursor is at the desired location. Unless the location of the hover input was a long way from the location at which the user desired to insert the cursor, panning of the display when simply inserting a cursor is unlikely to be needed. In the case where the user desires to highlight a section of text with start and end cursors, panning of the display is more likely to occur.

It will be appreciated from the above explanation of FIG. 3 that the zoom-pan mode is entered only after it is determined that a hover input has been detected. By configuring the terminal 100 such that the user can predict when the zoom-pan mode will be entered, the user can be confident that the display will be magnified for cursor placement when this is required. Another advantage of entering the zoom-pan mode only once the hover input has been detected is that the provision of the zoom-pan mode and the pointing mode does not need to affect operation of the terminal 100 when zooming is not required. For instance, in the event of a user providing a drag or swipe input for scrolling text, this can be achieved by the user providing the drag or swipe input without first providing a hover input. Because a hover input is not detected at step S6, the zoom-pan mode is not entered and the user input is processed in some other way.

Alternative embodiments will envisaged to the skilled person.

For example, although in the above end cursor placement is provided by panning the display at step S22 whilst touch input is still present, in particular is present at the edge of the display, alternatives will be envisaged. For instance, the terminal 100 may be configured to zoom out (reducing the zoom level) after placement of the start cursor and whilst the touch input is at or near the edge of the display. Such zooming out allows a greater proportion of the text window to be displayed, this proportion including the location of the start cursor, whilst allowing placement of the end cursor without the user removing the touch input. However, it suffers the disadvantage that the placement of the cursor at the desired end cursor location may be more difficult for the user because of the reduced zoom level at the time of placing the end cursor.

In a further alternative embodiment, the terminal 100 is configured to respond to determining that the touch input has been removed after some text has been highlighted by zooming out and subsequently allowing the user to select an alternative part of the text window in which to zoom to allow the user to place the end cursor. In this embodiment, the terminal 100 may be responsive to detecting that the user input remains in the hover input position between the two successive touch inputs. In this alternative embodiment, the terminal 100 may display the text window at the original zoom level (from step S5) whilst the hover input is present and then zoom into the additional zoom level (from step S8) once a second touch input is detected. Alternatively, the terminal 100 may be responsive to the detection of no hover input after the first touch input to return to the original zoom level and to response subsequent detection of a hover input to zoom the display to part of the text window at which the hover input is located, with cursor placement being provided after a touch input has subsequently been received.

The operation described above with reference to FIG. 3 solves a problem of pointing accuracy which can be experienced in some magnifying glass user interfaces. In some such interfaces, the location of a touch input forms the centre of a magnifying glass or fisheye region in which magnification is provided. However, areas of the display outside the magnifying glass or fisheye region remain unchanged. In these interfaces, the user may be able to see better where their user input is provided on the touch screen. However, it does not allow them more easily to place the input at a desired location. This problem is solved with the above-described operation by the combination of zooming in the zoom-pan mode and locking of the display in the pointing mode.

Operation of the terminal 100 in a first second of embodiments will now be described with reference to the flow chart of FIG. 10 and the state diagram of FIG. 4. Details of the second group of embodiments are the same as with the first group of embodiments unless otherwise stated or unless there is inconsistency between operation. The response of the terminal 100 to a touch input without a hover being detected beforehand is outside the scope of this specification and is not shown in FIG. 10.

Figure 11:
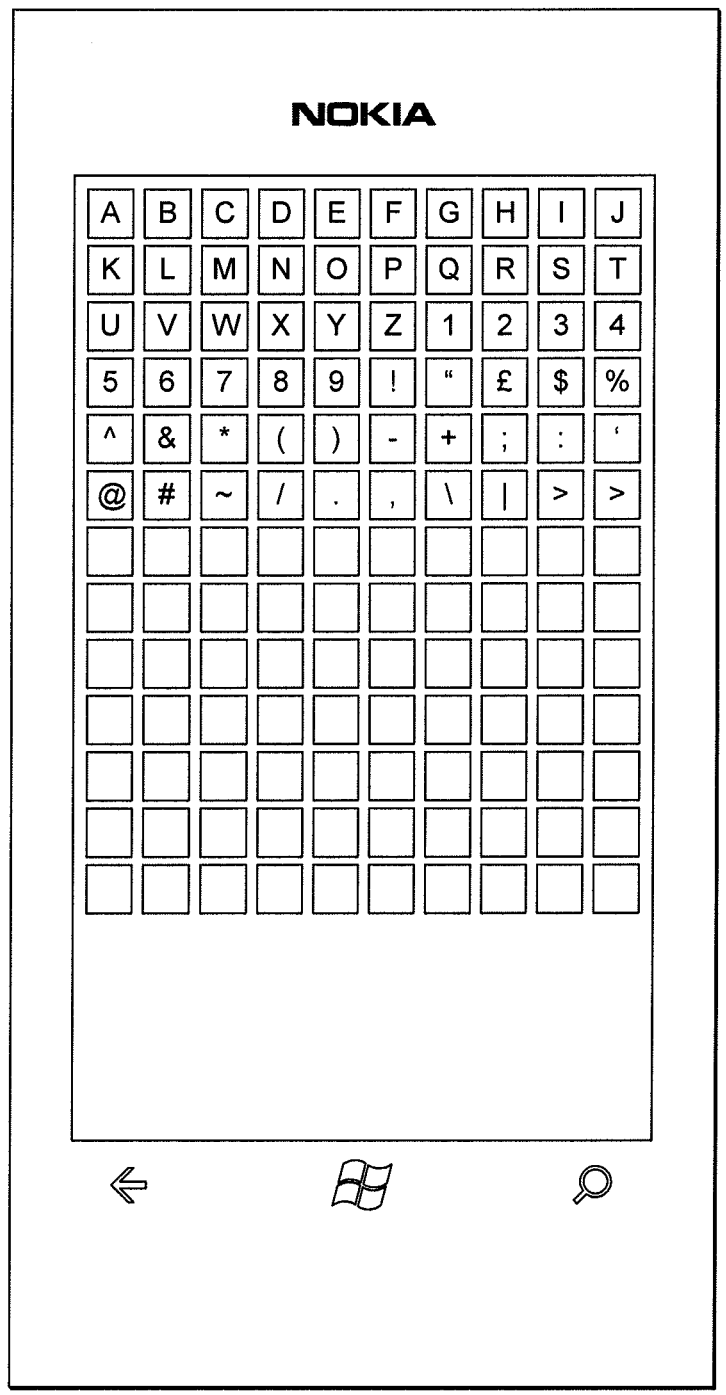
FIGS. 11 to 15 are screen shots illustrating displays of the FIG. 1 mobile device at different stages of operation in the second group of embodiments.

The operation starts at step S1, with the terminal 100 in normal mode. At step S2, an array of icons is displayed at their original size. This is illustrated in FIG. 11. Here, the terminal 100 is shown as providing a grid array of icons. The icons occupy most of the display area of the touch screen 102. The icons are arranged in a regular square grid pattern, although other array forms may alternatively be used. The icons here are square in shape, but they may take some other shape. The icons here are 5 mm square, but alternatively they may be 3 mm or 4 mm or 6 mm or 7 mm square, or some other size.

Between each icon and neighbouring icons is a small gap. A background image may be provided, the background image being visible in the gaps between the icons. The use of the background image and gaps between icons provides a more pleasing visual effect and improves readability for the user.

In FIG. 11, the icons can be said to be displayed at original size. In this example, all of the icons are of the same size, although alternatively some may be differently sized.

In the normal mode 41 and in the pointing mode 43 (to be described below), the terminal 100 is responsive to a user input at a location corresponding to one of the icons to perform an action associated with selection of the icon. In the example of the icons being thumbnails of photographs, the action may be opening the corresponding photograph, that is displaying the photograph in a full size view. In the case of the icon being a bookmark, detecting a user input at the location of the icon may cause the terminal 100 to go to a web page that is linked to by the bookmark. Clearly, these are merely examples. In the example of the icons being thumbnails of videos, detecting a user input at the location of the icon may cause the terminal 100 to open the video on a media player application or commence playing the video. In the example of the icon being text or a graphic denoting an e-book or text document, detecting a user input at the location of the icon may cause the terminal 100 to open the e-book or text document. In the example of the icon being an application shortcut, detecting a user input at the location of the icon may cause the terminal 100 to open the application. In the example of the icon being a contact icon, detecting a user input at the location of the icon may cause the terminal 100 to open the corresponding contact in a contacts application or take a predefined action associated with that contact, for instance initiate a call to that contact or open a blank message addressed to that contact.

The areas of the display 102 in which the terminal 100 is responsive to a user input may be termed target areas. There may be one target area per icon, with an input in a target area resulting in selection of the corresponding icon. A target area may coincide with the icon completely, i.e. the target area may be the same size and shape as the icon and be located at the same location as the icon. In this case, the gaps between the icons do not form part of any target area. Here, detection of a user input at a location on the touch screen 102 that is within one of the gaps does not result in selection of any of the icons. Alternatively, the target areas may be slightly larger than the icons. In these embodiments, there may or may not be gaps between adjacent target areas.

A user input in a target area may be detected typically when the user's digit is removed from the touch screen 102, i.e. at the time that the touch input ceases. If the location of the touch input moves between the starting and ending of the touch input, it is typically the location at the end of the touch input that is deemed to be the location of the input. Here, action is taken depending on the target area in which the user's digit was located at the time of removal of the user's digit from the touch screen 102. A user input may take one of a number of suitable forms. For instance, a short duration input, termed a "press", is one form of input. Another form of input is a "long press", which is a touch input at a location for a time period exceeding a threshold. The threshold may for instance be between 0.5 and 1.5 seconds, typically around one second.

At step S3, it is determined whether the zoom level has changed. The zoom level may change because of an input by a user, for instance using a pinch gesture, using a hardware key, or in some other way. If it is determined at step S3 that the zoom level has changed, at step S4 the zoom level is changed. If it is determined at step S3 that the zoom level has not changed or following step S4, at step S5 the text is displayed at the set zoom level. If the zoom level has not changed, then the set zoom level is the default zoom level. As such, FIG. 11 again represents the display resulting after step S5 when there has been no change in zoom level. FIG. 11 shows an array of icons being displayed by the terminal 100. The array includes wraparound such that icons on one line are a continuation of the sequence of icons on the line immediately above it. In the window shown in FIG. 11, all of the width of the array of icons is displayed. The sequence of icons is labelled alphabetically in this example.

At step S6, it is determined whether a hover input is detected. A hover input, or just hover, may be detected in any suitable way. A hover may be detected in response to determining that a user's digit is within the sensitivity range of the tactile/hover interface no. Alternatively, a hover may be detected in response to determining that a user's digit has been at a certain location within the zone of sensitivity of the tactile/hover interface no for greater than a predetermined period of time, which may be of the order of a few hundreds of milliseconds. Alternatively, a hover may be detected in response to determining that a user's digit is within a certain range, for instance 30 mm, of the touch screen 102.

If a hover input is not detected, the operation proceeds again to step S3. If it is determined that a hover input is detected, at step S7 the terminal 100 exits the normal mode and enters the zoom-pan mode. The transition from step S6 to step S7 is indicated by a transition T1 in FIG. 4.

Figure 12:
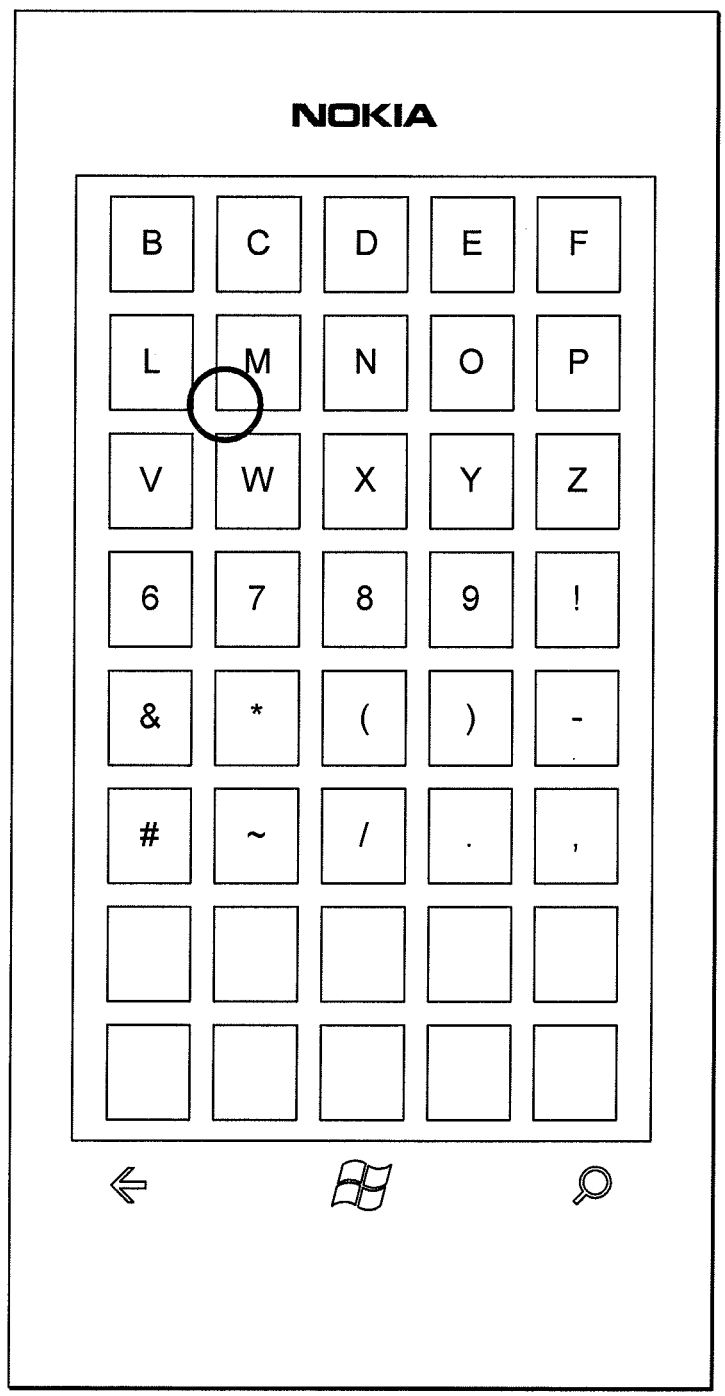

After this, at step S8 the zoom level is increased. Here, the zoom is centred around the location of the hover input. As such, it is the area of the display that was displayed at step S5 that is around the location of the hover input that is caused to be magnified. This is illustrated in FIG. 12. Here, the icons at the left side of the display of FIG. 5 are shown as being magnified in FIG. 12. Parts of the display that are not near the location of the hover input are no longer displayed. This includes the right side of the display of FIG. 11. The location of the hover input is represented by a circle.

At step S9, it is determined whether the location of the hover input has changed. If the hover input location is determined to have changed at step S9, at step S10 the display is panned with movement of the hover input location. Here, the display is panned such that the icons that are shown magnified follow the location of the hover input. Starting with the left side of the array of icons being magnified, as shown in FIG.

Figure 13:
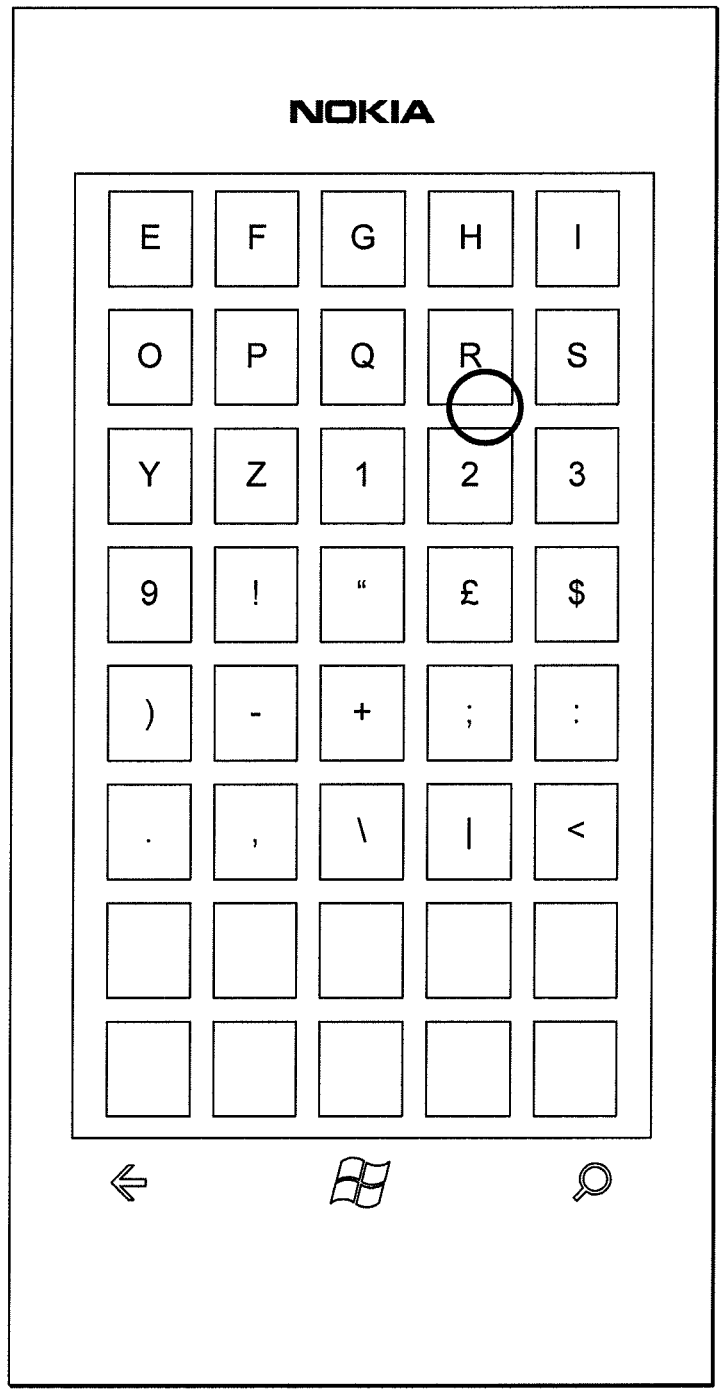

12, movement of the hover input to the right results in the icons displayed on the display scrolling to the left so that the icons on the right side of the display of FIG. 4 are displayed. This is shown in FIG. 13. Again, the location of the hover input is represented by a circle.

Similarly, if the location of the hover input moves up, the displayed icons are scrolled down so that the icons at the top of the display shown in FIG. 5 as displayed at step S5 are then revealed and displayed. Panning with movement of the hover input at step S10 has regard to the edges of the array of icons. Panning is limited such that the display text does not move beyond the boundaries of the array. This applies in both horizontal directions (left and right) and in both vertical directions (up and down).

Following step S10, the operation returns again to step S9, where it is determined whether the hover input location has changed.

When step S9 shows that no change in hover input location is detected, at step S11 it is determined whether the hover input has been removed. If step S11 determines that the hover input has been removed whilst the terminal 100 is in the zoom-pan mode, the zoom-pan mode is exited and the terminal 100 returns to the normal/zoom mode. In particular, the operation proceeds again to step S5. This is indicated by the transition T2 in FIG. 4.

If it is determined at step S11 that the hover input has not been removed, the terminal 100 remains in the zoom-pan mode and progresses to step S12. Here, it is determined whether a touch input has been detected. If a touch input has not been detected at step S12, the operation returns to step S9. If it is determined at step S12 that a touch input has been detected, the operation proceeds to step S13.

The effect of steps S9, S11 and S12 is such that the terminal 100 remains in the zoom-pan mode with the display being panned as the location of the hover input moves until either the hover input is removed or a touch input is detected. If the hover input is removed, the terminal 100 transitions T2 from the zoom-pan mode 42 to the normal/zoom mode 41. If a touch input is detected, the terminal 100 transitions T3 from the zoom-pan mode 42 to the pointing mode 43. The pointing mode is entered at step S13.

At step S14, the display is locked. This step prevents further panning of the display except in certain circumstances, that are explained below.

Figure 14:
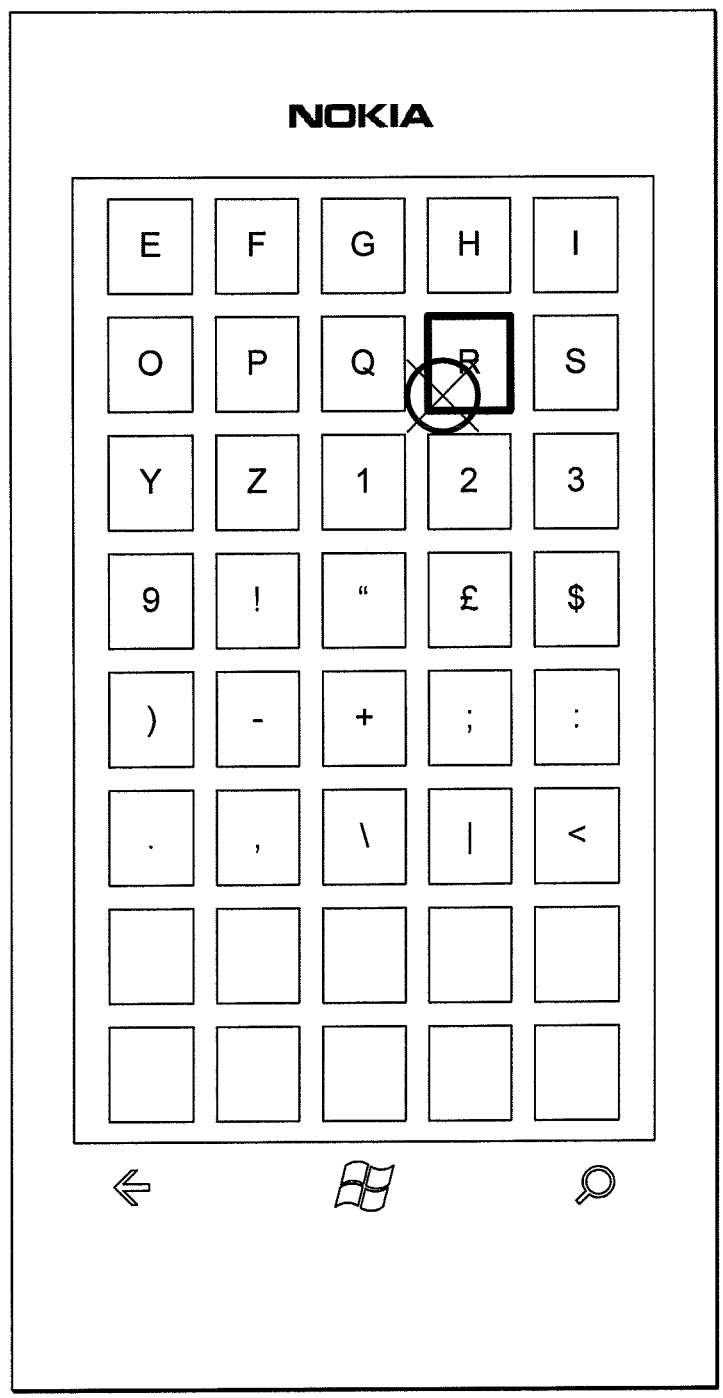

At step S14, a pointer or marker is provided at the location of the touch input. This provides the display shown in FIG. 14. The location of the touch input is represented by a circle with an X inside it. The pointer or marker may take any suitable form. For instance, it may take the form of an arrow, having a tip that identifies the marker location. Alternatively, a pointer may have some other shape or form. The main requirement of a pointer is that a user can determine the location to which the pointer is pointing. A marker is a form of pointer but may not include a pointer icon or pointer graphic. Instead, a marker may indicate a location by making that location appear different to other locations. For instance, a marker may indicate a position by providing a ripple or other dynamic graphical effect that is centred on a particular location. Alternatively, the marker may change the appearance of something present at the location. In an array of icons, a marker may be an icon that has a different visual characteristic to other icons. For instance, the marker icon may be differently coloured or differently visually textured. The marker may have a different brightness, or have edges with a different contrast to other icons. The marker may be dynamic in that a marker icon may change in visual appearance. For instance, a marker icon may flash or pulse in colour, brightness, contrast or any combination thereof. The marker may instead take any other suitable form. If the location of the touch input does not coincide with the target area of an icon, no marker or pointer is provided. Alternatively, a pointer may be provided in such a way that it is clear to the user that the pointed is not pointed at an icon. In FIG. 14, the icon that coincides with the touch input location is shown as having a different thickness frame (here, a thicker frame) than other icons.

Figure 15:
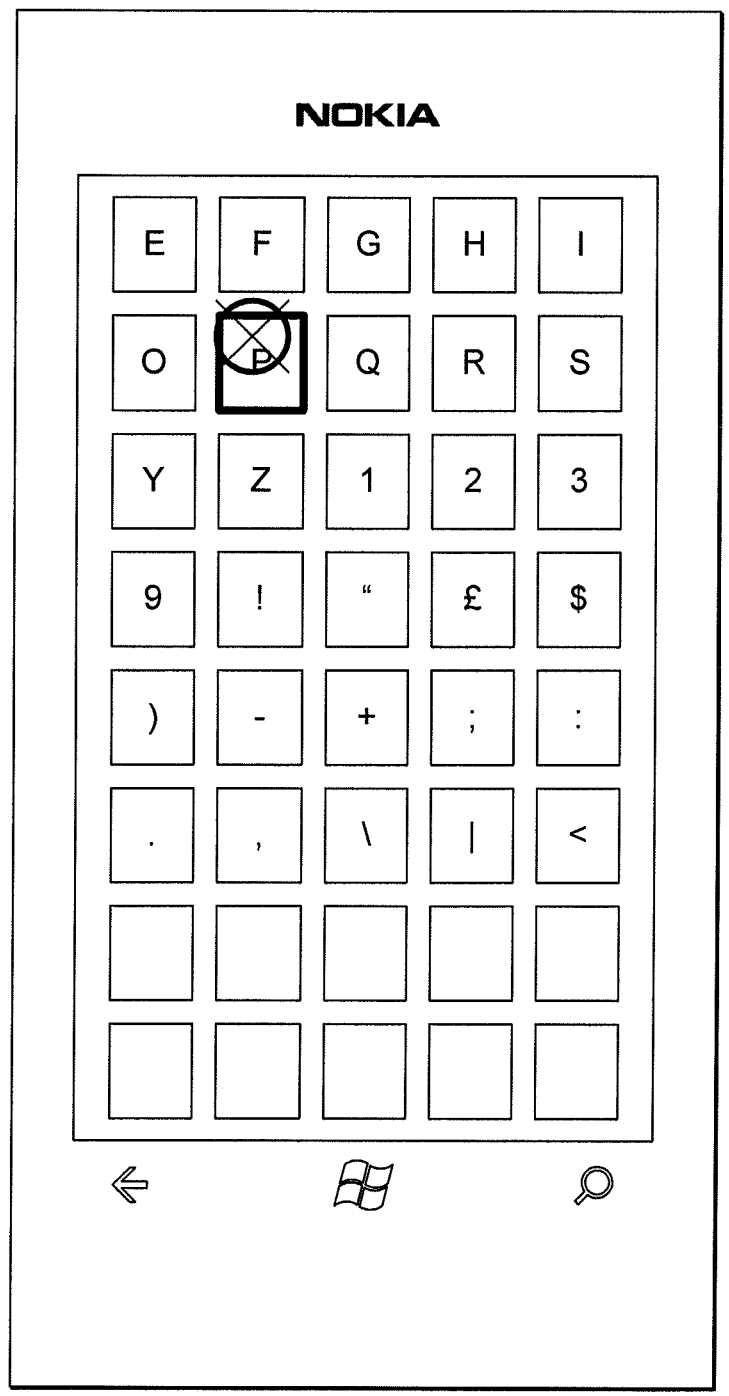

After step S14, it is determined at step S15 whether the touch input location has moved. If at step S15 it is determined that the location of the touch input has moved, the operation proceeds to step S16. Here, the location of the pointer or marker is moved along with the new location of the touch input. Movement can be left, right, up or down, or any combination of vertical and horizontal movement. After moving the touch input, a different icon may be pointed to or marked. This is shown in FIG. 15, where a different icon is marked. Again, the location of the touch input is represented by a circle with an X inside it.

After step S15 has indicated that the touch input has not moved or after moving the pointer at step S16, at step S17 it is determined whether the touch input has been removed. If it is determined that the touch input has not been removed at step S17, the operation returns to step S15. If it is determined at step S17 that the touch input has been removed, the operation proceeds to step S18.

As such, the operation repeats steps S15, S16 and S17 until it is determined that the touch input has been removed, in which case the terminal 100 exits the positioning mode 43 and the operation proceeds to step S18. The terminal 100 may not transition to the normal/zoom mode at this stage, though.

At step S18, the icon having a target area at the location of the touch input at the time of removal of the touch input is selected. If the location of the touch input does not coincide with the target area of an icon at the time of removal of the touch input, then no icon is selected at step S18. Selection of the icon can result in some action being taken that may depend on what the icon relates to and settings of the terminal 100. Some examples are given above. After step S18, the operation ends at step S19.

Moving of the pointer at step S16 may involve panning of the zoomed part of the array of icons, similarly to that described above with reference to the step S22 of FIG. 3.

Features described above with reference to FIG. 10 implement a two-stage icon selection process. In the first stage, a hover input results in a zooming in of the displayed array of icons. At this first stage, the user can pan around the array without selecting an icon. At the second stage, a touch input prevents further panning around the array of icons, and results in movement of a pointer or marker. Because in the second stage the array of icons is zoomed or magnified, selected of a desired icon is easier that it would have been prior to zooming. Additionally, in the event of the icons being thumbnails and having some other form that means that they are visually representative of the item that they represent, the provision of the pan-zoom mode can allow the user better to identify in a search an icon in which they are interested.

Moreover, the icon selection in the second stage can be achieved as a part of the same movement that resulted in the zooming. This contrasts with schemes in which zooming can be provided only by a pinching movement or by operation of a separate zoom control. The two stage process of using a hover input first for zooming then a touch input for icon selection can be said to provide a result that is greater than the sum of the constituent parts, since the two stages may be effected as part of the same movement of the user's digit.

It is worth noting that, when in the pointing mode, finger movement no longer affects the (zoomed or magnified) contents of the display. The contents of the display remain the same as prior to when the touch input was detected. Put another way, the user's digit no longer causes emulation of a magnifying glass centred at the digit location; instead the magnified view is locked. The magnified view may be partially unlocked if the user's digit is moved to the edge of the touch screen or near to the edge.

What use is made of selection of an icon is outside the scope of this specification.

Placement of the pointer or marker with respect to the location of the touch input may take any suitable form. For instance, the pointer or marker may be placed directly at the location of the touch input, i.e. beneath the user's digit. Alternatively, the pointer or marker may be placed slightly above the location of the touch input, i.e. above the location of the user's digit on the touch screen 102. The latter alternative may be preferred since it allows the user more easily to see the displayed pointer or marker and its position in the array of icons.

It is envisaged that the user typically will know which icon they wish to be selected in advance of making the user input. Upon making a hover input, the terminal 100 then enters the zoom-pan mode 42 and magnifies the position where the hover input was received. Upon making a touch input, the user may fine-tune their placement of the pointer or marker by making adjustments in horizontal and/or vertical directions until the pointer or marker is at the desired location. Unless the location of the hover input was a long way from the icon that the user wished to select, panning of the display when simply selecting an icon is unlikely to be needed. In the case where the user desires to browse icons to find a desired icon, panning of the display is more likely to occur.

Figure 10:
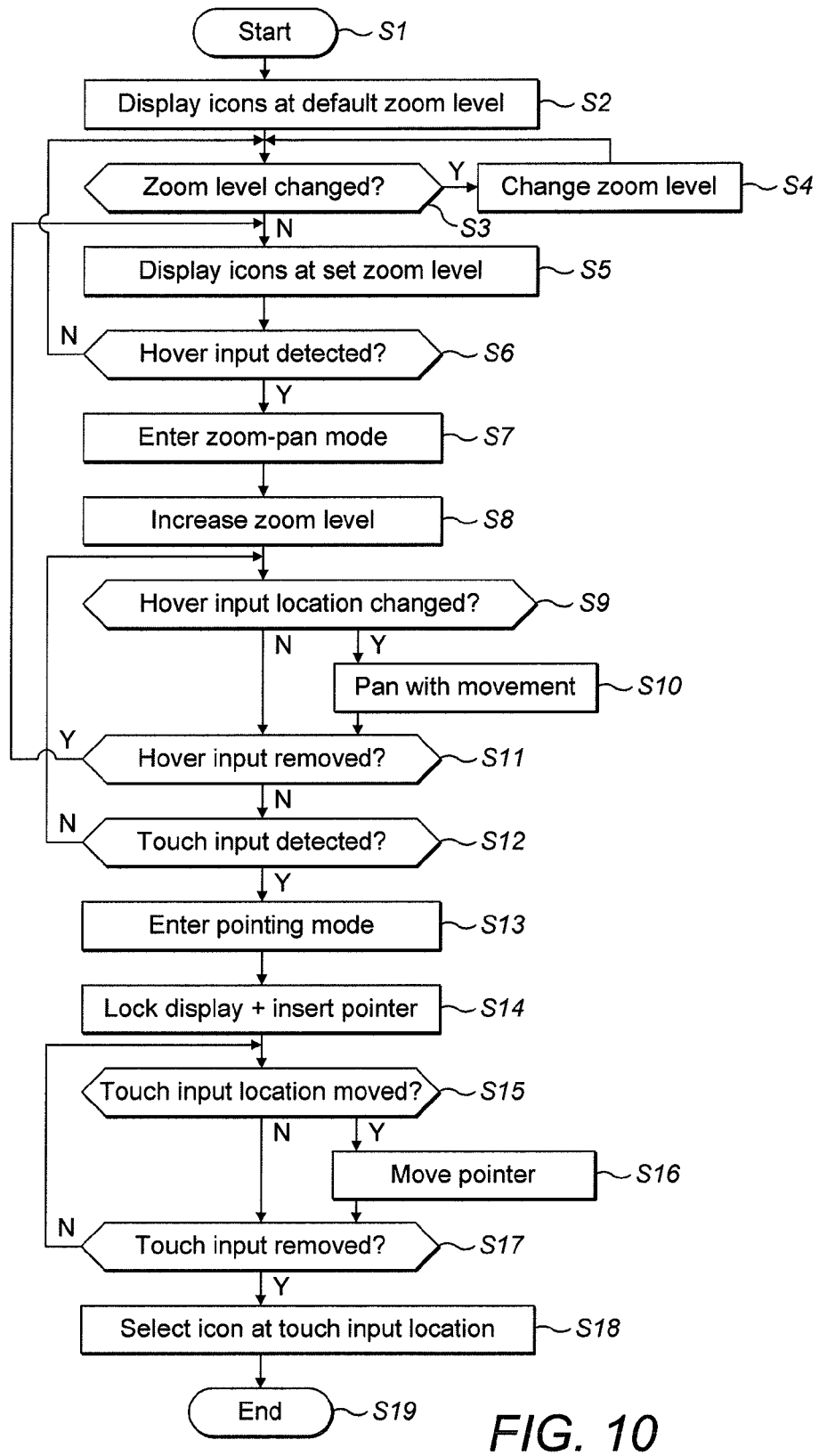
FIG. 10 is a flow chart illustrating operation of the FIGS. 1 and 2 mobile device in a second group of embodiments of the invention.

It will be appreciated from the above explanation of FIG. 10 that the zoom-pan mode is entered only after it is determined that a hover input has been detected. By configuring the terminal 100 such that the user can predict when the zoom-pan mode will be entered, the user can be confident that the display will be magnified for icon selection when this is required. Another advantage of entering the zoom-pan mode only once the hover input has been detected is that the provision of the zoom-pan mode and the pointing mode does not need to affect operation of the terminal 100 when zooming is not required. For instance, in the event of a user providing a drag or swipe input for scrolling through the array of icons, this can be achieved by the user providing the drag or swipe input without first providing a hover input. Because a hover input is not detected at step S6, the zoom-pan mode is not entered and the user input is processed in some other way.

The operation described above with reference to FIG. 10 solves a problem of pointing accuracy which can be experienced in some magnifying glass user interfaces. In some such interfaces, the location of a touch input forms the centre of a magnifying glass or fisheye region in which magnification is provided. However, areas of the display outside the magnifying glass or fisheye region remain unchanged. In these interfaces, the user may be able to see better where their user input is provided on the touch screen. However, it does not allow them more easily to place the input at a desired location. This problem is solved with the above-described operation by the combination of zooming in the zoom-pan mode and locking of the display in the pointing mode.

Various alternative embodiments will envisaged to the skilled person. Various additional features will also be envisaged.

For instance, in the pan-zoom mode, the zoom level may be in some way dependent on the z distance of the hover input. For instance, the zoom level may increase as the user's digit moves closer to the touch screen 102 until it reaches a maximum level at the time where the touch input is made, whereupon the zoom level remains constant in the pointing mode. The increase in zoom level may be continuous, in the sense that the zoom level gradually increases with decreasing z distance. Alternatively, it may be stepped, in the sense that the zoom level takes one value for a z distance in a range of z distances, and takes a different value for a z distance that is lower than the minimum value of that range. The number of steps of different zoom levels between the normal/zoom mode and the zoom level in the pointing mode may take any suitable value, for instance 3, 4 or 5.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A computer-implemented method comprising:
   in a normal mode, causing display of plural discrete items on a touch screen;
   in response to detecting when in the normal mode a user's digit at a location hovering over but not touching the touch screen while plural discrete items are being displayed in the normal mode, entering a zoom-pan mode;
   in response to entering the zoom-pan mode, causing zooming of the displayed plural discrete items;
   when in the zoom-pan mode, responding to detection of movement of the user's digit to a different hover location over the touch screen by causing panning of the plural discrete items displayed on the touch screen;
   when in the zoom-pan mode, responding to detection of a touch input by entering a pointing mode;
   when in the pointing mode, preventing panning of the displayed plural discrete items with movement of the location of the touch input within predefined criteria; and
   when in the pointing mode, causing movement of a cursor, pointer or marker as the location of the touch input changes.

2. A method as claimed in claim 1, wherein the discrete items are text characters.

3. A method as claimed in claim 2, comprising depositing a cursor at the location of the touch input in response to detecting removal of the touch input when in the pointing mode.

4. A method as claimed in claim 1, wherein the discrete items are icons.

5. A method as claimed in claim 4, comprising selecting an icon at the location of the touch input in response to detecting removal of the touch input when in the pointing mode.

6. A method as claimed in claim 1, comprising responding to detecting removal of the touch input when in the pointing mode by reverting to the normal mode and causing zooming out of the plural discrete items.

7. A method as claimed in claim 1, comprising responding to detecting removal of the touch input when in the pointing mode by reverting to the normal mode and causing zooming out of the plural discrete items to a zoom level that existed at the time of entering the zoom-pan mode.

8. A method as claimed in claim 1, comprising responding to detecting removal of the touch input when in the zoom-pan mode by reverting to the normal mode and causing zooming out of the plural discrete items.

9. A method as claimed in claim 1, comprising responding to detecting removal of the touch input when in the zoom-pan mode by reverting to the normal mode and causing zooming out of the plural discrete items to a zoom level that existed at the time of entering the zoom-pan mode.

10. Apparatus, the apparatus having at least one processor and at least one memory having computer-readable code stored thereon which when executed controls the at least one processor:
   in a normal mode, to cause display of plural discrete items on a touch screen;
   in response to detecting when in the normal mode a user's digit at a location hovering over but not touching the touch screen while plural discrete items are being displayed in the normal mode, to enter a zoom-pan mode;
   in response to entering the zoom-pan mode, to cause zooming of the displayed plural discrete items;
   when in the zoom-pan mode, to respond to detection of movement of the user's digit to a different hover location over the touch screen by causing panning of the plural discrete items displayed on the touch screen;
   when in the zoom-pan mode, to respond to detection of a touch input by entering a pointing mode;
   when in the pointing mode, to prevent panning of the displayed plural discrete items with movement of the location of the touch input within predefined criteria; and
   when in the pointing mode, to cause movement of a cursor, pointer or marker as the location of the touch input changes.

11. Apparatus as claimed in claim 10, wherein the discrete items are text characters.

12. Apparatus as claimed in claim 11, wherein the computer-readable code when executed controls the at least one processor to deposit a cursor at the location of the touch input in response to detecting removal of the touch input when in the pointing mode.

13. Apparatus as claimed in claim 10, wherein the discrete items are icons.

14. Apparatus as claimed in claim 13, wherein the computer-readable code when executed controls the at least one processor to select an icon at the location of the touch input in response to detecting removal of the touch input when in the pointing mode.

15. Apparatus as claimed in claim 10, wherein the computer-readable code when executed controls the at least one processor to detect removal of the touch input when in the pointing mode by reverting to the normal mode and causing zooming out of the plural discrete items.

16. Apparatus as claimed in claim 10, wherein the computer-readable code when executed controls the at least one processor to respond to detecting removal of the touch input when in the pointing mode by reverting to the normal mode and causing zooming out of the plural discrete items to a zoom level that existed at the time of entering the zoom-pan mode.

17. Apparatus as claimed in claim 10, wherein the computer-readable code when executed controls the at least one processor to respond to detecting removal of the touch input when in the zoom-pan mode by reverting to the normal mode and causing zooming out of the plural discrete items.

18. Apparatus as claimed in claim 10, wherein the computer-readable code when executed controls the at least one processor to respond to detecting removal of the touch input when in the zoom-pan mode by reverting to the normal mode and causing zooming out of the plural discrete items to a zoom level that existed at the time of entering the zoom-pan mode.

19. A non-transitory computer-readable storage medium having stored thereon computer-readable code, which, when executed by computing apparatus, causes the computing apparatus to perform a method comprising:
   in a normal mode, causing display of plural discrete items on a touch screen;
   in response to detecting when in the normal mode a user's digit at a location hovering over but not touching the touch screen while plural discrete items are being displayed in the normal mode, entering a zoom-pan mode;
   in response to entering the zoom-pan mode, causing zooming of the displayed plural discrete items;
   when in the zoom-pan mode, responding to detection of movement of the user's digit to a different hover location over the touch screen by causing panning of the plural discrete items displayed on the touch screen;
   when in the zoom-pan mode, responding to detection of a touch input by entering a pointing mode;
   when in the pointing mode, preventing panning of the displayed plural discrete items with movement of the location of the touch input within predefined criteria; and
   when in the pointing mode, causing movement of a cursor, pointer or marker as the location of the touch input changes.

* * * * *